US005335892A

United States Patent [19]

Busch

[11] Patent Number: 5,335,892

[45] Date of Patent: Aug. 9, 1994

[54] REMOVABLE ADHESIVELY MOUNTED RETENTION PLATE

[75] Inventor: Paul F. Busch, Palo Alto, Calif.

[73] Assignee: Anchor Pad International, Huntington Beach, Calif.

[21] Appl. No.: 961,791

[22] Filed: Oct. 15, 1992

[51] Int. Cl.$^5$ .............................................. F16M 13/00

[52] U.S. Cl. .................................... 248/551; 248/680; 156/71; 156/344

[58] Field of Search .......................... 156/71, 344, 584; 248/551, 680, 683; 52/410

[56] References Cited

U.S. PATENT DOCUMENTS

| | | | |
|---|---|---|---|
| 3,291,432 | 12/1966 | Lucasey | 248/551 X |
| 3,612,469 | 10/1971 | Dennis | 248/551 X |
| 3,850,392 | 11/1974 | Gassaway | 248/687 X |
| 3,910,079 | 10/1975 | Gassaway | 70/232 X |
| 4,065,083 | 12/1977 | Gassaway | 248/551 |
| 4,858,878 | 8/1989 | Gassaway | 248/680 X |
| 4,884,420 | 12/1989 | Finkel et al. | 248/551 X |
| 4,893,777 | 1/1990 | Gassaway | 248/505 X |

*Primary Examiner*—David A. Simmons
*Assistant Examiner*—Mark A. Osele
*Attorney, Agent, or Firm*—Donald D. Mon

[57] ABSTRACT

A removable adhesively mountable retention plate for holding protected articles to a base structure such as a desk. A stiff metal base plate is bonded to one face of an adhesive pad, the pad having an adhesive surface on the other of its faces. The adhesive surface is to be bonded to the base structure, thereby to retain the base plate to it. A plurality of spaced apart threaded openings are formed through the plate. The pad is apertured among these openings. A jack screw is threaded into at least some of these openings to exert a separative force between the base structure and the pad to release the pad from the base structure.

3 Claims, 2 Drawing Sheets

REMOVABLE ADHESIVELY MOUNTED RETENTION PLATE

FIELD OF THE INVENTION

This invention relates to equipment security devices for holding valuable articles to a base structure by means of an adhesively mounted retention plate, and more particularly to removal of the plate and its adhesive-faced pad with minimal risk of damage to the surface of the base structure.

BACKGROUND OF THE INVENTION

Articles such as CPUs, calculators and word processors are valuable enough to be worth stealing. For this reason, security means have been provided which hold them against unauthorized removal. One well known family of security devices is exemplified by Gassaway patent Nos.3,850,392 and 3,910,079.

A characteristic of the Gassaway device, which is in widespread usage, is a rigid base plate held to a base structure such as a desk or a counter by a pad. The pad is made of a dense structural foam, and is faced on both of its sides with a pressure-sensitive adhesive. When the plate is adhered to the mat, and the mat is adhered to the base structure, the plate will be firmly held. The plate is provided with lock means removably to attach a protected article to it. The article can then be removed only by authorized manipulation of the lock means.

Various arrangements are made in Gassaway-type devices to frustrate removal of the plate from the base structure. The most obvious approach to removal is to cut the mat, or to pry the base plate off of the surface. These procedures are opposed by means which prevent entry of a garrot wire, or exertion of peeling forces on the adhesive by prying up on the base plate.

It is always possible for a thief to overcome reasonable security precautions if he is willing to risk the price of interception, or of damage to the stolen goods, which must be fenced for him to profit. With the use of sufficient tooling for cutting or prying, a thief can remove the article from its base structure. However, he must bring the tools with him and take the time necessary to use them.

Herein lies the advantage of the adhesive pad. It is very resistant to separative tensile forces, so that very strong forces must be exerted to remove it from a base structure. These forces will often damage the base plate and the goods and render them unsalable. While it is of no concern to the thief, they will usually also harm the desk or the counter—but sometimes pieces of those will come off along with the article.

Thus, the objectives of the base plate are robe rigid and to protect the pad against lateral access and peeling, while the pad must resist tensile removal (popping off). Clearly this is intended to be a strong permanent attachment. Now the problem arises: what it one wants to move the protected article to another location and to remove the base plate from the base structure? The very design of the base plate and mat are intended to frustrate this purpose.

Adhesively mounted base plates are sometimes removed by heating them to a temperature which will sufficiently soften the foam or the adhesive that the metal plate can be removed. Sometimes the plate takes all of the mat with it, and sometimes not. Sometimes the temperature attained is low enough that a desk surface will not be damaged and sometimes not. These are serious problems in an office.

These are not the concerns of a thief. Generally, if a theft can not be completed in five minutes, it should not be attempted. If it takes more than five minutes for the heat process, the heat process will not be used. For this reason, more stringent forces are most frequently used to steal the protected article.

It is an object of this invention to provide means to remove a rigid base plate and its adhesive mat from a base structure with minimal or no damage to the surface of the structure, and without applying heat. Here, advantage is taken of an inherent property of the pad and its adhesive—it is vulnerable to a gradual peeling force. A gradual peeling force is precisely what the thief can not tolerate. He does not have time for a benign process that may take a half hour or longer—he must be away in about five minutes or take the risk of interception.

Not only can the base plate be removed (along with the pad) with this invention, but in a second procedure the pad can be removed from the plate, so the more expensive plate can be reused by applying a replacement pad.

BRIEF DESCRIPTION OF THE INVENTION

A stiff metal base plate has lateral dimensions of length and width, a first face to which a protected article is to be held, and a second face to which a pad is adhesively adhered. The pad has a first and a second face each with an adhesive layer. The first adhesive layer is adhered to the second face of the metal plate. The second adhesive layer is intended to be adhered to the surface of a base structure such as a desk or a counter.

The base plate has one or more threaded openings which extend from face to face, each adapted to receive a threaded jack screw. The pad has an aperture therethrough to pass the screw so it can bear against the base structure, whereby exertion of force on the structure by the screw exerts a gradual peeling force on the pad where it surrounds the screw, and the pad will gradually be peeled away from the structure.

If it is desired to remove the pad from the metal plate, a release plate will have been placed between them at the time the pad was adhered to the base plate. The release plate is apertured so as to permit adherence of the pad and the base plate over part of the release plate's area. A threaded neck in the release plate receives a threaded release plug which can be turned to press against the base plate and start a peeling action between the pad and the plate to remove the pad.

The above and other features of this invention will be fully understood from the following detailed description and accompanying drawings, in which:

DETAILED DESCRIPTION OF THE INVENTION

Figure 1:
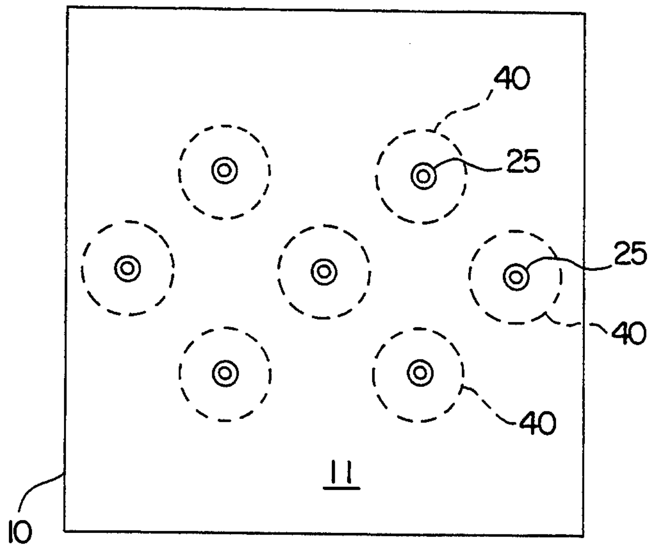
FIG. 1 is a plan view of the invention.
Figure 2:
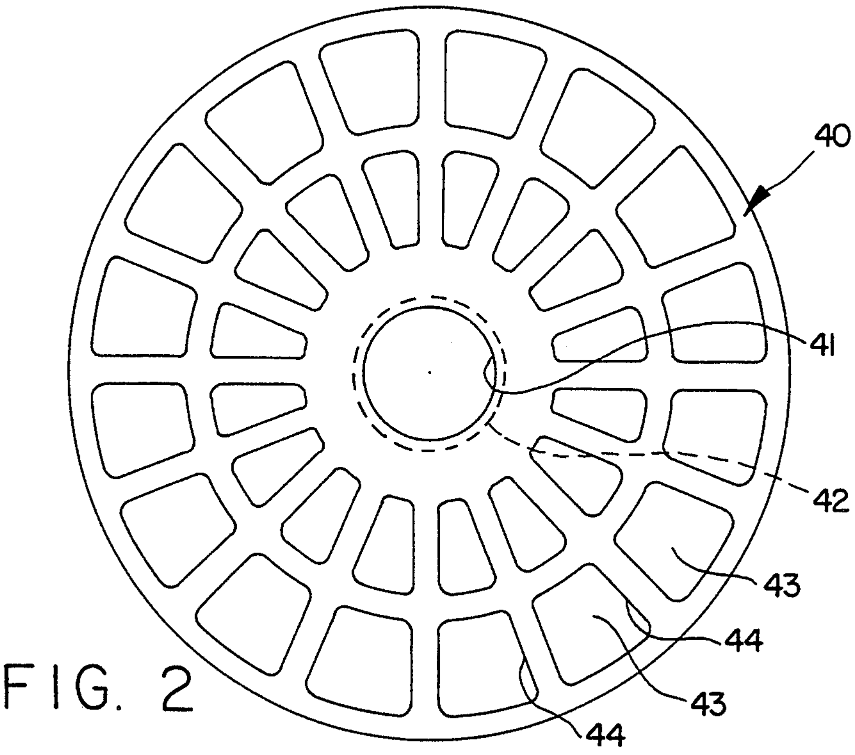
FIG. 2 is a plan view of an optional part of the invention.
Figure 6:
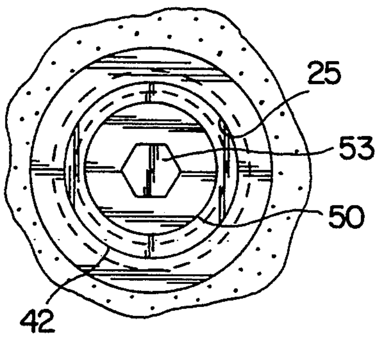
FIG. 6 is a fragmentary bottom view of FIG. 5, with wrench 54 removed.

A security device according to this invention includes a stiff metal base plate 10 having a substantial area 11. It has an upper first face 12 and a lower second face 13, both of which are preferably planar. Usually a peripheral skirt (not shown) will extend around the plate and depend downwardly to exclude garrot wires.

A pad 15 has a first upper face 16 and a second lower face 17. Respective layers 18, 19 of adhesive on the pad, are adhered to the second face of the base plate, and to the surface 20 of a base structure 21, such as a desk or counter.

When originally provided, layer 19 will be covered by a peelable sheet of material which will protect the pad during handling, and will prevent premature attachment. It is not shown in the drawings.

A plurality of threaded openings 25 are provided in the plate. In a plate of the dimensions described below, seven is a good number of them. Because the plate will usually be made of a mild steel that is stiffly flexible, and only thick enough to provide sufficient rigidity, inserts 26 (FIG. 3 ) will be fitted in the openings to provide sufficient threads for the purposes of this invention.

The pad has an enlarged aperture 30 around each opening for purposes yet to be described.

While the pad is in place, with or without an article attached to it, in some configurations it will provide a smooth upper face on which other articles can be laid. However, the base plate will ordinarily be provided with features reliably to hold an article to it, which can render the surface irregular. They are not pertinent to this invention, and for this reason are not shown. Examples will be found in Gassaway patents Nos. 3,850,392, 4,858,878, and 4,893,777, which are incorporated herein by reference for their showing of such means.

Figures 3, 4, 5:
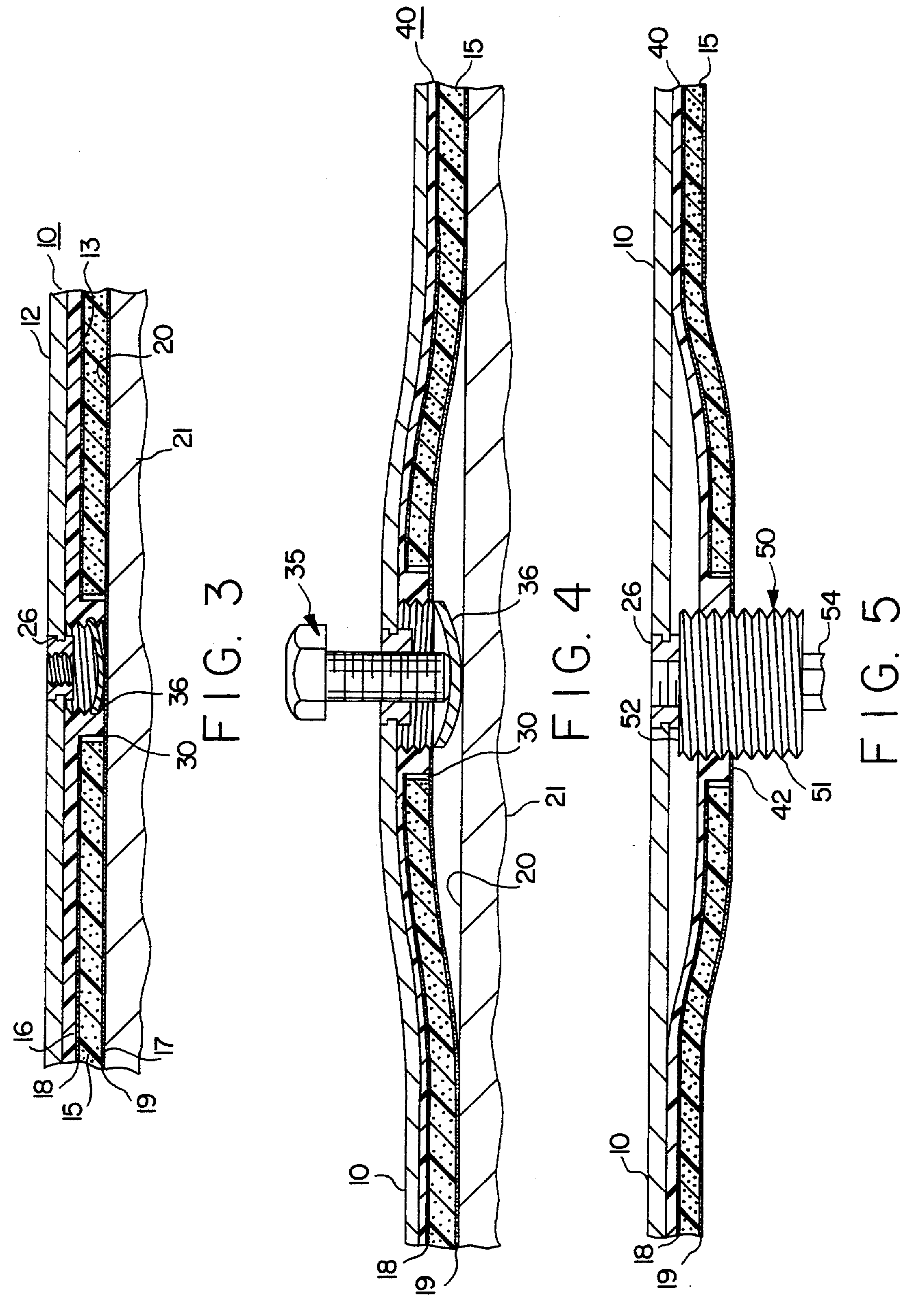
FIG. 3 is a cross-section showing the invention installed.
FIG. 4 is a fragmentary cross-section showing the invention being removed.
FIG. 5 is a fragmentary cross-section showing the pad being removed from the plate.

Jack screws 35 are threaded into openings 25 when the plate is to be removed from the base structure (FIG. 4). To protect the surface, a spreader plate 36 is placed at the end of each screw. The spreader plate is preferably free to rotate relative to the screw so as further to protect the structure.

As shown in FIG. 4, The gradual tightening of the screws against the structure, will, in time, start the pad to peeling from the edge of the aperture 30. The screws will be tightened from time to time. This is not a quick reaction, and the user must be patient. Its purpose is to exert a strong localized gradual lifting (peeling) force. This is precisely what the security feature of the device proposes to avoid, but at this time the security feature has been released and the jack screws are given access to edge regions around apertures 30. There will usually be some deflection of the base plate adjacent to the jack screws, but this is not a permanent deformation.

After the pad has been released, it will be carried away with the base plate. Should it not be desired to re-use the base plate, both can be discarded, and a new base plate and pad can be provided. Very often this will be the situation, and the above release constitutes an invention in itself.

In some situations-it will be desired to save the metal base plate, and to remove and replace the pad. Few people will have the patience, or can afford the time to scrape the pad off and then clean the second face of the plate. With this invention, a clean removal of the pad is made possible, although it may take overnight to do it. Fortunately, constant attention is not necessary.

Again to take advantage of the pad's weakened resistance to peeling, a release plate 40 is placed between the second face of the metal plate and the first face of the pad when the pad is first assembled to the base plate. This is shown in all of the Figures. However, the release plate is optional and will not be provided when reuse of the plate will not be desired.

Release plate 40 is preferably generally circular. It has a central aperture 41 with a threaded neck 42. Viewed in plan it has a plurality of substantial apertures 43. These are large enough to permit the pad to adhere to the metal plate without substantial risk of peeling inside the perimeter of the release plate. The intervening webs 44 separate the adhesive from the metal plate, and provided areas where peeling can begin.

A release plug 50 has an external thread 51 which can engage the thread in neck 42. Its nose 52 can be brought against the second face of the base plate or against insert 26. A non-circular recess 53, preferably horizontal, can receive a wrench 54 to turn the plug. Continuing to turn it will lift the neck relative to the plate, and start a peeling action, not only at the center but also along the webs as the peeling progresses. Ultimately the pad will release from the base plate.

As best shown in FIG. 1, a plate 40 is provided for each of the openings, and together they overlay a substantial portion of the plate area.

Experience will teach the designer the precise shapes for the base plate and for release plates 40. The following dimensions are those of a suitable product.

Base plate: 14 inches×14 inches.

Seven jack screw apertures, three on one center line, the other in staggered array.

Release plate: Outer diameter $2\frac{1}{2}$ inches.

The pad is preferably a foam whose density is about 29 lb/cubic foot, elongation 160 percent, and tensile adhesive force 50 psi. A suitable foam is obtainable from Nortom Performance Plastics, Granville, N.Y. as its product V1200.

A base plate is thereby rendered removable, and its adhesive pad also removable, by this invention.

This invention is not to be limited by the embodiment shown in the drawings and described in the description, which is given by way of example and not of limitation, but only in accordance with the scope of the appended claims.

I claim:

1. In a security hold down device having a stiff metal base plate and a pad, said pad being adhesively bonded to the base plate on one of its faces, and having an adhesive surface on the other of its faces for bonding to a base structure, the improvement comprising means for separating said pad from said structure, said means comprising:

a plurality of spaced apart threaded openings through said plate, said pad being apertured around said openings, and a jack screw in at least some of said openings adapted to be brought against said base structure to exert a separative force between said base structure and said pad.

2. Apparatus according to claim 1 in which a foot is provided on each of said jack screws to protect said base structure.

3. Apparatus according to claim 1 further including a release plate disposed between said base plate and said pad, having a substantial area around a respective opening in the base plate, and apertures through it to permit substantial adhesion of the pad to the metal plate, and a central threaded aperture; and an externally threaded release plug threaded into said neck adapted to bear against the plate to release the pad from the plate.

* * * * *